US011868931B2

(12) United States Patent
Li

(10) Patent No.: US 11,868,931 B2
(45) Date of Patent: Jan. 9, 2024

(54) RELIABILITY-AWARE MULTI-AGENT COVERAGE PATH PLANNING

(71) Applicant: Kabushiki Kaisha Toshiba, Tokyo (JP)

(72) Inventor: Mickey Li, Bristol (GB)

(73) Assignee: Kabushiki Kaisha Toshiba, Tokyo (JP)

( * ) Notice: Subject to any disclaimer, the term of this patent is extended or adjusted under 35 U.S.C. 154(b) by 119 days.

(21) Appl. No.: 17/218,715

(22) Filed: Mar. 31, 2021

(65) Prior Publication Data
US 2022/0318720 A1   Oct. 6, 2022

(51) Int. Cl.
*G06Q 10/0631* (2023.01)
*G06N 3/126* (2023.01)
*G06F 16/901* (2019.01)

(52) U.S. Cl.
CPC . *G06Q 10/063118* (2013.01); *G06F 16/9024* (2019.01); *G06N 3/126* (2013.01); *G06Q 10/06313* (2013.01); *G06Q 10/06316* (2013.01); *G06Q 10/063114* (2013.01); *G06Q 10/063116* (2013.01)

(58) Field of Classification Search
None
See application file for complete search history.

(56) References Cited

U.S. PATENT DOCUMENTS

| | | | | |
|---|---|---|---|---|
| 8,260,485 | B1 * | 9/2012 | Meuth | G06Q 10/04 701/26 |
| 8,539,438 | B2 * | 9/2013 | Bassin | G06F 8/70 717/124 |
| 10,713,151 | B1 * | 7/2020 | Zinger | G06F 11/3684 |
| 11,455,530 | B2 * | 9/2022 | Fang | G06N 3/08 |
| 2007/0239472 | A1 * | 10/2007 | Anderson | G06Q 50/02 705/7.26 |
| 2018/0231972 | A1 | 8/2018 | Woon et al. | |

(Continued)

FOREIGN PATENT DOCUMENTS

| CN | 102160005 A | 8/2011 |
|---|---|---|
| CN | 108897312 A | 11/2018 |

OTHER PUBLICATIONS

Li et al., "Reliability-Aware Multi-UAV Coverage Path Planning Using Integer Linear Programming", 3$^{rd}$ UK-RAS Conference for PhD Students & Early Career Researchers, Apr. 2020, https://www.ukras.org/wp-content/uploads/formidable/21/UKRAS20_paper_18.pdf, 3 pages.

(Continued)

*Primary Examiner* — Stephanie Z Delich
(74) *Attorney, Agent, or Firm* — Oblon, McClelland, Maier & Neustadt, L.L.P.

(57) ABSTRACT

Arrangements described herein provide a reliability-aware method of determining a schedule for performing a set of tasks for agents. The arrangements determine the schedule based on an objective function that aims to provide a greater probability of completion of the schedule. This allows a more reliable schedule to be determined that takes into account the risk that one or more of the agents will fail during the operation of the schedule. This ensures that the schedule integrates sufficient fail-safes to avoid or at least reduce the need for rescheduling to account for agent failure.

16 Claims, 13 Drawing Sheets

(56) References Cited

U.S. PATENT DOCUMENTS

2018/0232523 A1*  8/2018  Copty ................... G06F 21/577
2018/0365139 A1* 12/2018  Rajpal .................. G06F 21/577
2019/0035100 A1*  1/2019  Ebrahimi Afrouzi ... G06T 7/344
2019/0094870 A1*  3/2019  Afrouzi ................ G05D 1/0274

OTHER PUBLICATIONS

Song et al., "CARE: Cooperative Autonomy for Resilience and Efficiency of Robots Teams for Complete Coverage of Unknown Environments under Robot Failures", May 29, 2019, https://arxiv.org/pdf/1905.12191.pdf, 21 pages.

* cited by examiner

RELIABILITY-AWARE MULTI-AGENT COVERAGE PATH PLANNING

TECHNICAL FIELD

The present disclosure relates to methods and devices for determining a schedule for multiple agents to perform a set of tasks. In particular, but without limitation, this disclosure relates to determining a reliability-aware method of determining a schedule for performing a set of tasks for agents (e.g. unmanned vehicles) interacting with an environment under the condition that each agent has a predefined failure rate.

BACKGROUND

Many tasks require inspection of physical spaces, such as inspection of structures or vehicles (such as aeroplanes). Traditionally for structural inspection a team of people are sent to scale buildings with ladders, scaffolding and, in some cases, with helicopters (e.g. power line inspection), which can be dangerous and expensive. More recently, with the advent of small affordable drones (e.g. quadcopters/multi-rotors), companies may hire a single pilot with a single drone to conduct surveys. A number of businesses now offer integrated survey services which include data analysis, 3D modelling, etc. included with a single pilot and drone.

To avoid manual inspection, autonomous control can be applied (autonomous inspection). This can be performed in 2D (for example surveying a field) and some cases in 3D (for inspecting the inside or outside of structures). In the literature, this problem is posed as a Coverage Path Planning Problem (CPP), where the agent is required to cover (physically visit, or observe with a sensor) the entire environment. However, few works attempt to utilise multiple robots or drones, and even less consider real world implementation issues to this planning.

BRIEF DESCRIPTION OF THE DRAWINGS

Arrangements of the present invention will be understood and appreciated more fully from the following detailed description, made by way of example only and taken in conjunction with drawings in which.

DETAILED DESCRIPTION

Figure 1:
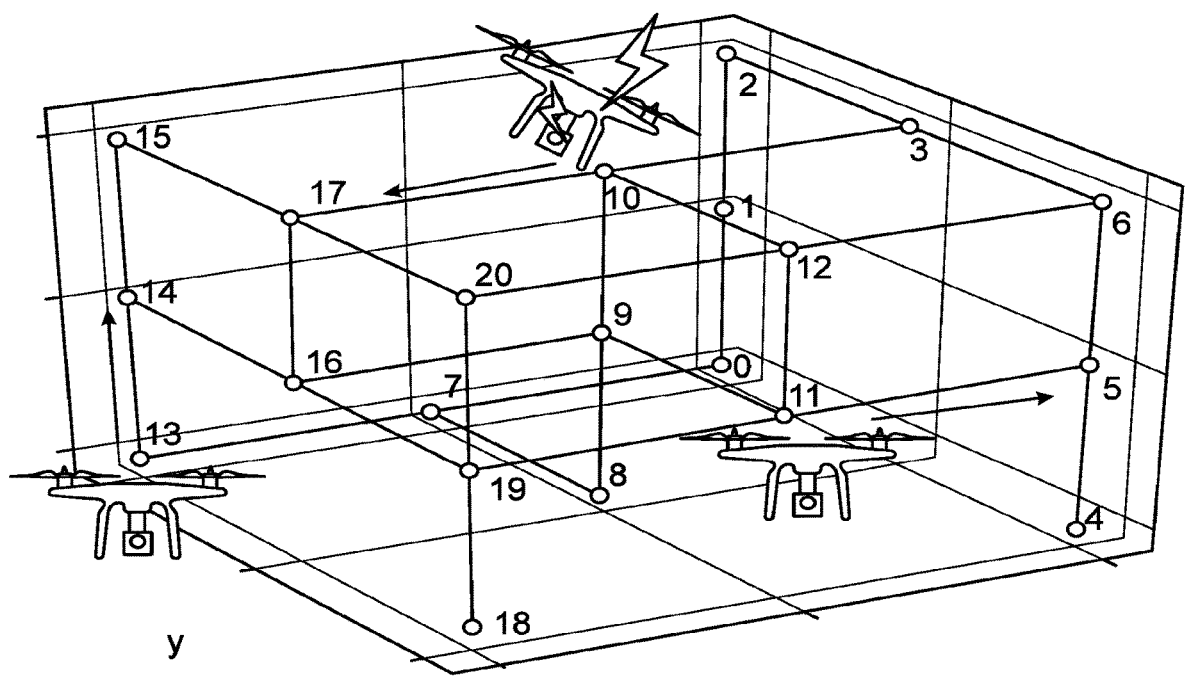
FIG. 1 shows a graph describing an environment for path planning.

Arrangements described herein provide a reliability-aware method of determining a schedule for performing a set of tasks for agents. The arrangements determine the schedule based on an objective function that aims to provide a greater probability of completion of the schedule. This allows a more reliable schedule to be determined that takes into account the risk that one or more of the agents will fail during the operation of the schedule. This ensures that the schedule integrates sufficient fail-safes to avoid or at least reduce the need for rescheduling to account for agent failure.

According to a first aspect there is provided a computer-implemented method for determining a schedule for multiple agents to perform a set of tasks, the method comprises: obtaining a graph representing an environment in which the agents are to act, the graph including nodes relating to tasks and edges relating to traversable paths between tasks; determining a schedule for performing the set of tasks, the schedule comprising, for each agent, a sub-schedule including tasks to be performed and, for each task to be performed, a corresponding scheduled range of times over which to perform the task; evaluating, for the schedule, a probability of completion of the schedule, the probability of completion of the schedule being the probability that each task in the set of tasks will be completed subject to the condition that each agent has a predefined failure rate; and determining an updated schedule based on an objective function that aims to provide a greater probability of completion of the schedule. Evaluating the probability of completion comprises: determining a completion region within state space, wherein the completion region is the range of potential states of the environment that could be achieved by following the schedule such that every task has been visited at least once by any of the agents; identifying one or more sub-regions within the completion region, each sub-region relating to a given combination of tasks being performed simultaneously by the agents according to the schedule; and determining the total probability mass within the completion region including determining the sum over all sub-regions within the completion region of the probability of completion of each sub-region, wherein the probability of completion of each sub-region is determined by determining the integral of the probability of completion over the sub-region.

Determining the probability of completion of each sub-region by determining the integral of the probability of completion over the sub-region allows the method to be implemented on continuous space, thereby allowing the method to be implemented on real-world scenarios with tasks of varying duration.

According to an arrangement each sub-region is bounded for each agent by start and end times for the scheduled range of times for performing the corresponding task for that agent and for that sub-region. Furthermore, determining the integral of the probability of completion over the sub-region comprises: determining, for each agent, a probability of completion of the sub-region by subtracting a probability of failure by the start time for the sub-region and agent from a probability of failure by the end time for the sub-region and agent; and determining the probability of completion of the sub-region by multiplying together the probabilities of completion for each agent.

According to an arrangement the probability of completion of each sub-region is determined based on a failure model for each agent, wherein the failure model represents a probability of failure for the agent by a given time.

According to an arrangement each edge of the graph has a length that represents a distance of the corresponding traversable path. The length may therefore represent a time taken for an agent to move between two tasks. These lengths may be of variable length, so the time for each task (e.g. the time between the starting of one task and the starting of a subsequent task) may vary.

According to an arrangement determining the updated schedule comprises optimizing the schedule using a genetic algorithm that selects members, each member representing a schedule or a sub-schedule based on their fitness, wherein the fitness is determined based on the probability of completion for the member.

According to an arrangement each member represents a potential schedule and the fitness of a given schedule is determined based on the probability of completion for the given schedule.

According to an arrangement the fitness function is one of: a function that aims to maximise the probability of completion for the given schedule; and a function that aims to maximise the probability of completion for the given schedule whilst minimizing the time to complete the given schedule with no agents failing.

According to an arrangement the genetic algorithm includes implementing one or more genetic operators on a selection of members. The genetic operators may include one or more of: selecting a sub-schedule from a member and swapping a pair of consecutive tasks; adding a task to a sub-schedule of a member; removing a task from a sub-schedule of a member; cycling tasks from a sub-schedule of a member such that the sub-schedule starts at a different task in the sub-schedule; selecting two sub-schedules from a member and for each, splitting the sub-schedules at a split-point to form start and end portions, and splicing the start portion of each sub-schedule to the end portion of the other sub-schedule; and swapping sub-schedules between two agents for a member.

According to an arrangement the genetic algorithm is implemented for each agent to select a sub-schedule for each agent. Each member may represent a potential sub-schedule for a given agent. The fitness of a given sub-schedule may be determined based on the probability of completion of a potential schedule including the given sub-schedule and any previously determined sub-schedules.

According to an arrangement the genetic algorithm includes implementing one or more genetic operators on a selection of members. The genetic operators may include one or more of: swapping a pair of consecutive tasks for a member; adding a task to a member; removing a task from a member; cycling tasks from a member such that the sub-schedule for the member starts at a different task in the sub-schedule; and selecting two members and for each, splitting the sub-schedule at a split-point to form start and end portions, and splicing the start portion of each sub-schedule to the end portion of the other sub-schedule.

According to an arrangement determining a completion region within state space comprises, for at least one of the agents, applying a binary search to identify the earliest task within the completion region. This provides a more efficient means for determining a boundary of the completion region. For all other agents, the method may search the set of tasks, running in order to tasks or time, until the boundary is found.

According to an arrangement the method further comprises sending the updated schedule to the agents for implementation.

According to an arrangement the agents are mechanical agents for interacting with a real-world environment. For instance, the agents may be for controlling one or more drones or unmanned vehicles (e.g. unmanned ground vehicles, unmanned aerial vehicles, unmanned surface vehicles and/or unmanned underwater vehicles). These unmanned vehicles may be for inspecting a region. The graph may therefore represent a set of viewpoints that are to be inspected.

According to an arrangement each agent controls an unmanned vehicle having a camera for inspecting the environment, wherein each task represents a given viewpoint within the environment.

Nevertheless, the methods described herein are applicable to scheduling any types of agents to perform any types of tasks.

According to a further aspect there is provided a computing system comprising one or more processors configured to: obtain a graph representing an environment in which the agents are to act, the graph including nodes relating to tasks and edges relating to traversable paths between tasks; determine a schedule for performing the set of tasks, the schedule comprising, for each agent, a sub-schedule including tasks to be performed and, for each task to be performed, a corresponding scheduled range of times over which to perform the task; evaluate, for the schedule, a probability of completion of the schedule, the probability of completion of the schedule being the probability that each task in the set of tasks will be completed subject to the condition that each agent has a predefined failure rate; and determine an updated schedule based on an objective function that aims to provide a greater probability of completion of the schedule. Evaluating the probability of completion comprises: determining a completion region within state space, wherein the completion region is the range of potential states of the environment that could be achieved by following the schedule such that every task has been visited at least once by any of the agents; identifying one or more sub-regions within the completion region, each sub-region relating to a given combination of tasks being performed simultaneously by the agents according to the schedule; and determining the total probability mass within the completion region including determining the sum over all sub-regions within the completion region of the probability of completion of each sub-region, wherein the probability of completion of each sub-region is determined by determining the integral of the probability of completion over the sub-region.

According to an arrangement the computing system further comprises mechanical agents configured to implement the updated schedule in a real-world environment.

The present application proposes a multi-agent coverage path planning methodology which incorporates knowledge of the probabilistic failure distribution of each individual agent in order to maximise the reliability of mission completion within a fixed time duration. This method provides a significant increase in mission completion reliability when compared to existing coverage path planning methods. In large environments, such as the inspection of an aeroplane, the present method provides 98% reliability—a 60% increase in comparison to non-reliability based methods.

In general, the methodology described herein aims to provide improved multi-agent path planning. Ensuring performance with respect to time constraints and external risks is a common requirement in real-life planning. This is especially true in aerial robotics applications, as small unmanned aerial vehicles (UAVs) are prone to failures. Multi-UAV solutions are attractive for their flexibility, scalability, and tolerance to individual failure in comparison to single-UAV solutions. This comes at the cost of more challenging coordination, for which task allocation methods typically seek efficient division of work to prioritise early completion. However, consider the example of a railway bridge inspection: the priority is to avoid disruption to services, requiring reliable completion before the passage of the next train. This may demand a different distribution of work to that prioritising an early finish. A reliability-informed Multi-UAV approach has the potential to achieve these requirements where Single UAV solutions may struggle.

The methodology described herein proposes improved methods of Reliability-Aware Multi-UAV Coverage Path Planning (RA-MCPP). The Reliability-Aware Multi-Agent Coverage Path Planning problem is to find paths for each agent (each robot) which will maximise the probability that every part of the environment will be covered by a deadline. It extends Multi-Agent Coverage Path Planning (MCPP) which solely seeks to find minimum cost paths such that the whole environment is visited. In MCPP, to minimise the cost (e.g. the travel time) each node is planned to be visited by only a single robot. However, this is a poor solution for RA-MCPP, as a single robot failure would require another robot to complete the missed tasks in addition to its own, likely exceeding the allotted time and incurring additional costs. RA-MCPP uses explicit models of agent failure-rates to optimise the Probability of Completion (PoC). Hence it promotes overlapping robot-task allocations, offering higher mission reliability at the expense of nominal-case time.

It is possible to approach the RA-MCPP task assuming synchronous motion of agents across a uniform lattice of tasks. This enables a Markov model of PoC to be embedded in optimisers such as Mixed Integer Linear Programming (MILP) or Genetic Algorithms (GA). This approach, however, has a number of drawbacks. Firstly, this approach can only be applied to the limited domain of discrete time and space. This means that it cannot compute path plans involving real distances with asynchronous flying agents, unlike the arrangements proposed herein. Secondly, an Integer Linear Program solver is not able to handle continuous time and space domains like RA-MCPP, and is also not scalable to real-world inspection problems.

The contribution of the present application is to extend RA-MCPP to less constrained scenarios. This allows coverage plans to be evaluated on arbitrary environment graphs and thus arbitrary distances between consecutive viewpoints, and also provides the ability to handle real-life inspection environments.

A comparison with existing multi-agent coverage methods on an aeroplane inspection scenario and a laboratory tour scenario demonstrates that the arrangements described herein can produce plans with higher mission reliability in more realistic conditions.

The present methodology can be applied to any 'agent', be it a ground based robot or aerial vehicle, which requires some notion of coverage. This includes applications such as area inspection, patrolling, exploration etc.

To solve the above problems, arrangements described herein comprise: (i) an algorithm to compute a 'probability of completion' metric, i.e. the reliability of a given coverage path plan, and (ii) an optimisation method for finding the reliability-optimal plan known as 'greedy genetic optimisation'.

FIG. 1 shows a graph describing an environment for path planning. The graph includes nodes representing positions (or viewpoints) at which agents (e.g. robots or drones) can be located and edges that represent traversable paths between the nodes. The edges can encode the distance between nodes, thereby allowing the traversal time between nodes to be determined.

The viewpoints and edges can be determined based on any criteria. For instance, the viewpoints can be selected to ensure that a particular object or region being inspected (e.g. a building or aeroplane) can be viewed from all angles (e.g. to maximise viewpoint coverage through the minimum number of nodes/locations). Nevertheless, the selection of nodes is beyond the scope of the present application.

Given the above graph-based environment where the nodes represent viewpoints and edges represent the distance between traversable nodes, arrangements described herein determine a strategy/plan the agents for ensuring that each node is visited at least once before an overall mission deadline. A plan (or strategy) describes, for each agent, the time at which the nodes are visited by the corresponding agent, implicitly encoding the traversal order for the agent. This can be in the form of matrix encoding for each agent the time that the agent first visits a given node (first performs the particular task).

The arrangements described herein incorporate the probability of agent failure into the planning process which can give a concrete probability of mission completion by a given deadline. The probability of failure of any individual agent, i, characterised by a probability distribution curve $f_i(t)$ over time can be attained through physical experimentation. Then for a fleet of n agents, in an environment described by a graph $G(J,E)$ consisting of m tasks where E describes the valid traversable paths between any two tasks, the mission is for each viewpoint or task to be visited by at least one agent by a deadline specified according to mission parameters.

Given the above, the probability that every node will be visited by a given deadline can be computed by first identifying all possible 'completion states', defined to be the set of times agents are required to survive in order for mission completion, and secondly computing the sum of probabilities of arriving in a completion state. This sum is defined to be the probability of completion of a strategy. Then in order to find reliability-optimal multi-agent coverage plans, optimization (e.g. genetic optimisation) is applied iteratively to successively find agent paths which maximise the Probability of Completion metric.

Figure 2:
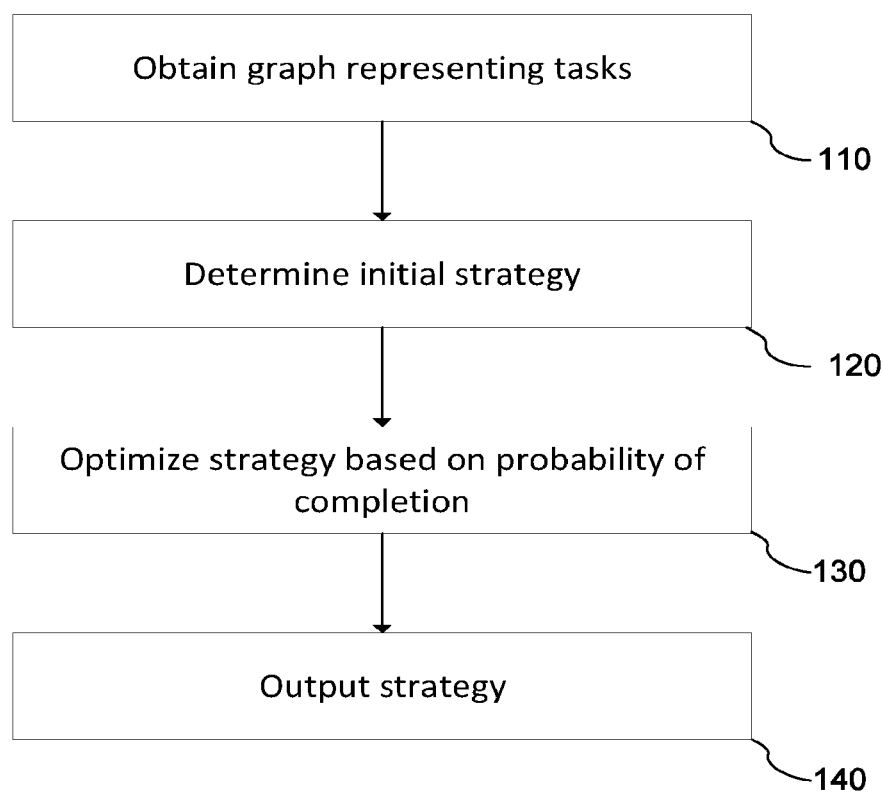
FIG. 2 shows a method for determining a strategy for completing a set of tasks in accordance with an arrangement.

FIG. 2 shows a method for determining a strategy for completing a set of tasks in accordance with an arrangement.

A graph representing the tasks is obtained 110. Based on this graph, an initial strategy is determined 120. This might be determined for n agents initially through clustering the graph into n clusters. A condition may be applied to this clustering to ensure that the clusters are of similar sizes (load balancing). The strategy is then optimized based on the probability of completion 130 (e.g. with an objective function that aims to increase the probability of completion). This may be performed over a predefined number of optimization steps, and/or until a given predefined probability of completion is obtained. Optimization may be through genetic optimization (as discussed below). The final strategy is then output 140. The output may be to agents (e.g.

mechanical agents controlling autonomous systems in a real world environment) for enacting the strategy. The method may be enacted by a central planning system that then pushes the strategy to the agents for implementation.

Probability of Completion (PoC)

The arrangements described herein aim to find an optimal strategy based on an objective function that aims to increase the probability of completion.

Formally, the state of the system of n agents a time t with a deadline $\bar{t}$ (by which the tasks are to be complete) can be defined as $x=(t_1, \ldots, t_n) \in [0,\bar{t}]^n=S$, where $t_i$ is the length of time agent i has survived. On this basis, $t_i$ is equal to the current time if the agent is currently active and is equal to the time that it failed where it has previously failed. That is, for a current time t, $$t_i = \begin{cases} t & \text{where agent } i \text{ is still active} \\ t_i' & \text{where agent } i \text{ failed at } t_i' \end{cases}$$

The environment graph G(J, E) defines a set of m individual tasks, described by the nodes $J=(j_1, \ldots j_m)$, with the edges E describing valid traversable paths between two tasks. For an agent i, the failure probability density is denoted by $f_i(t)$ and represents the probability of failure at a given time. Similarly, the cumulative density $F_i(t)$ denotes the probability of agent i failing at any time up to and including t. The probability of agent i surviving at time t is the reliability $R_i(t)=1-F_i(t)$.

The behaviour of the agents is dictated by a strategy $\psi$ which is made up of n paths $\psi_i$, that is, $\psi=\{\psi_1, \ldots, \psi_n\} \in \Psi^n$. Each path $\psi_i \in \Psi$ is a finite ordered subset of connected tasks j E J (i.e. a path through G). Each path $\psi_i$ defines, for each task of a subset of J, a time for the agent to perform the task. The strategy $\psi$ can therefore be represented by a matrix, defining, for each agent, a time for performing each of a corresponding subset of tasks. In practice, if an agent is not scheduled to perform a task at any point, the time for performing this task may be set to infinity.

Given the above, the objective is to find n paths in the strategy $\psi=\{\psi_1, \ldots, \psi_n\}$ which maximizes a reliability metric based on probability of completion PoC($\psi$) by a deadline $\bar{t}$, whilst ensuring that all tasks are visited at least once. Multiple reliability metrics (objective functions) are proposed herein. One objective function aims to maximize PoC, whilst another provides a multi-objective that aims to maximize PoC whilst minimizing the time to complete the strategy. These will be described further below.

For maximizing the probability of completion, this objective can be formally represented as:

$$\max_{\psi \in \Psi^m} PoC(\psi) \text{ subject to,}$$

$$\bigcup_{i \in 1 \ldots n} \psi_i = J$$

$$(\psi_{i,k}, \psi_{i,k+1}) \in E \quad \forall k < |\psi_i|, \forall i \in 1 \ldots n$$

The present arrangement achieves this by determining the probability mass over a completion region representing the range of states of the environment at which all nodes have been visited at least one.

Given a particular strategy $\psi$, agents will move through the environment (represented by G) and complete tasks with a possibility of failing. At each state x of the system, either all tasks have been visited (completed), or not. Therefore, given $\psi$, the full state space S can be partitioned into two non-intersecting regions of completion $C_\psi$, and non-completion $C_\psi^-$.

For any strategy given as a set of paths $\psi$, an allocation matrix $T^\psi \in \mathbb{R}^{n \times m}$ can be defined, where the elements $T_{ij}^\psi$ are the first time at which agent i is scheduled to complete task j. This is valid, as completion of task j is dependent only on each agents' first scheduled visit to j. If an agent is able to complete a task the first time it has visited it, then later visits to the task do not effect the overall goal (of visiting each task at least once). The only reason an agent may miss a certain scheduled task is due to it failing to visit the first time. Therefore a task j is considered completed by agent i if $t_i \geq T_{ij}^\psi$ and the completion region $C_\psi$, can be defined as follows:

$$C_\psi = \{x \in S | \forall j \exists i t_i \geq T_{ij}^\psi\}$$

That is, the completion region is the range of states of the environment such that, for all tasks j, at least one agent has visited the task.

Figure 3:
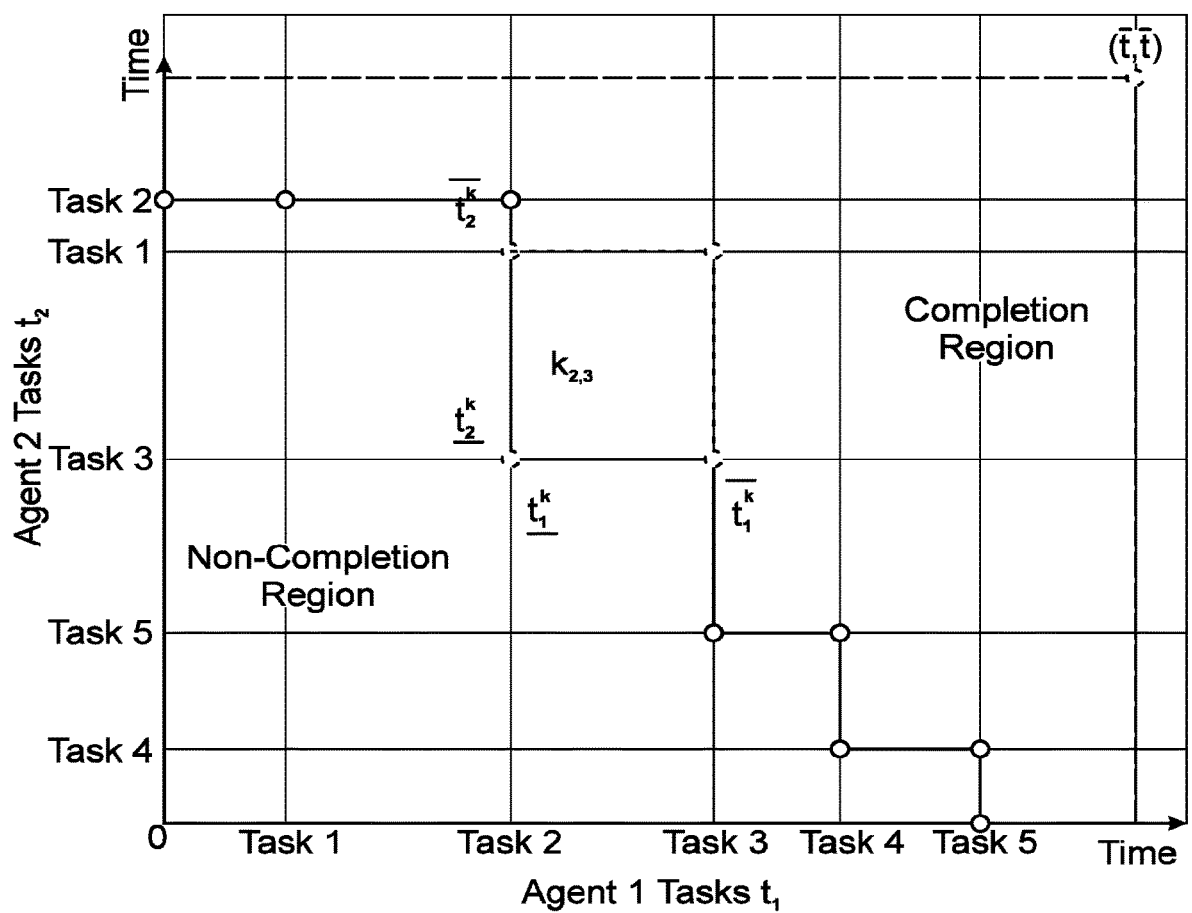
FIG. 3 shows an annotated state space for two agents following an example strategy according to an arrangement.

FIG. 3 shows an annotated state space for two agents following an example strategy according to an arrangement. In this example, each agent is allocated five tasks, in a different order for each agent. The two axes describe the state (time alive) for each agent $t_i$ (representing states $x=(t_1, t_2)$). A deadline $\bar{t}$, by which all tasks must be completed, is shown via a dashed line.

The times at which each agent's tasks have been scheduled are marked on the axis and grid lines. Then, for this particular strategy, the bold line denotes the boundary between the completion region and the non-completion region. This boundary is the earliest set of points where completion has been achieved, i.e. where $t_i=T_{ij}^\psi$. The region above and to the right of the boundary (and including the boundary), thus graphically defines the completion region $C_\psi$. This completion region stretches onwards to infinite time.

The probability of completion (PoC) is then defined as the probability that any realisation of the system will reach a completion state and fall within the completion region. In general, this is equivalent to computing the total probability mass within the completion region.

Note that in FIG. 3, the completion region is comprised of rectangles $k \subseteq C_{104}$ formed by the task orderings. Each region represents a certain combination of tasks to be performed simultaneously by the agents. For instance, the region $k_{2,3}$ represents the time between the $2^{nd}$ and $3^{rd}$ task for agent 1 and the time between the $3^{rd}$ and $4^{th}$ tasks for agent 2 (in this case, each task is considered to take 0 time to complete, so visiting the task is sufficient to complete it). Accordingly, the system ending in region $k_{2,3}$ is a result of the case where agent 1 and agent 2 fail between their $2^{nd}$ and $3^{rd}$, and $3^{rd}$ and $4^{th}$ assigned tasks respectively.

Given the above, the probability density of each region k is defined by the scheduled times $\underline{t_i^k}$ and $\overline{t_i^k}$ for consecutive tasks of each agent i, where $\underline{t_i^k}$ and $\overline{t_i^k}$ are the lower and upper time bounds for the region k for each agent i. That is, for agent i, tLL is the time that the agent is scheduled to start the task for that agent for region k. Equally, $\overline{t_i^k}$ is the time that the agent is scheduled to start the next task following region k. Accordingly, for the purposes of calculating the probability of completion, the probability of completing a task includes the probability of visiting the task and the probability of successfully travelling to the next task. Each region therefore relates to a particular combination of tasks to be performed simultaneously, wherein the tasks include visiting a particular task and travelling to the next task.

The probability of completion (PoC) is then the sum of the integral over the probability densities of each $k \subseteq g \; C_\psi$. With more agents, the dimension of the state space increases, and the regions k now define hyper-rectangles in n-d space with n agents.

More formally, given independent agents, each with a failure cumulative density function $F_i(t)$, the probability of completion (PoC) for a given path plan $\psi$ is the integral of the probabilities of reaching any state within the completion region $C_\psi$:

$$PoC(\psi) = \int_{x \in C_\psi} p(x) dx = \sum_{k \subseteq C_\psi} \prod_{i \in [1...n]} F_i(\overline{t_i^k}) - F_i(\underline{t_i^k})$$

where $\underline{t_i^k}$ and $\overline{t_i^k}$ refer to the lower and upper time bounds of the region k for each agent i, corresponding to the scheduled times of consecutive tasks of the agent. Note, for a region k corresponding to an agent's last scheduled task, $\overline{t_i^k} = \infty \Rightarrow F_i(\overline{t_i^k}) - F_i(\underline{t_i^k}) = 1 - F_i(\underline{t_i^k}) = R_i(\underline{t_i^k})$, the reliability.

According to the above, the probability of completion of a given strategy can be calculated by identifying the all regions within the completion region and determining the sum of the probability of completion for each region.

In order to compute the probability of completion, the solver must enumerate all of the boundaries of each region $k \subseteq C_\psi$. Having said this, the boundary of the completion region is not known, so the solver must search through all combinations of tasks, discarding those that do not fall within the completion region.

Accordingly, along each dimension, the solver selects (in order of increasing time/tasks within the strategy) the next region k and determines whether it is within completion region. If not, then the region is ignored (or at least $F_i(\overline{t_i^k}) - F_i(\underline{t_i^k})$ is set to zero) and then the next region is selected. If the region is within the completion region, then the probability of completion for that region ($F_i(\overline{t_i^k}) - F_i(\underline{t_i^k})$) is added to the overall probability of completion.

This is equivalent to enumerating all combinations of tasks for each agent according to the strategy and computing the density of the corresponding k regions, resulting in 0 (mn) complexity for n agents and m tasks. This can, however, be made more efficient through improved searching.

Observe that state space is divided into two continuous regions, separated by a single continuous border (separating the completion and non-completion regions). By taking advantage of this topology, the method can be improved by only considering all possible combinations of tasks for n−1 agents (as described above). Then, for each combination of the n−1 agents (each region in the n−1 dimensions), a binary search can then be applied over the tasks of the $n^{th}$ agent to find the earliest task for which the corresponding region is within $C_\psi$, i.e. earliest task lying on the boundary. In FIG. 2, this is equivalent to, for each row, performing a binary searching for the boundary, and calculating the density of the strip to the right of that boundary.

In general, a binary search selects the mid-point within a range and makes a determination. In this case, the determination is whether that mid-point falls within the completion region. If not, then a subsequent mid-point is chosen from the range of time that is greater than or equal to the mid-point. If so, then the subsequent mid-point is chosen from the range of time that is less than the mid-point. The method is repeated until the desired value is found (in this case, the earliest k region in the completion region $C_\psi$). Once this boundary has been found, the sum of probabilities of completion is calculated over the regions that occur later in time (i.e. across the completion region).

This method improves the complexity to $O(m^{n-1} \log m)$. Especially when used as an optimisation objective, the improvement in computational efficiency is significant for the many evaluations of strategies with large numbers of tasks and agents.

Optimization

The goal of the solver is to find the strategy $\psi$ which will maximise probability of completion while completing the mission subject to environmental constraints. Whilst a variety of optimization methods are applicable, this application includes two optimisation methods based on genetic optimization. The two approaches are referred to as a 'Path-Based Genetic Algorithm' and the 'Greedy-Genetic Algorithm'. Both are included as they both perform well in evaluation, but are not sufficiently different to warrant their own categorisation.

A genetic algorithm is a meta-heuristic optimisation approach characterised by modelling the state as a chromosome, and randomly applying operators known as genetic operators (such as mutation or crossover) in order to find optimal chromosomes scored by fitness.

Figure 4:
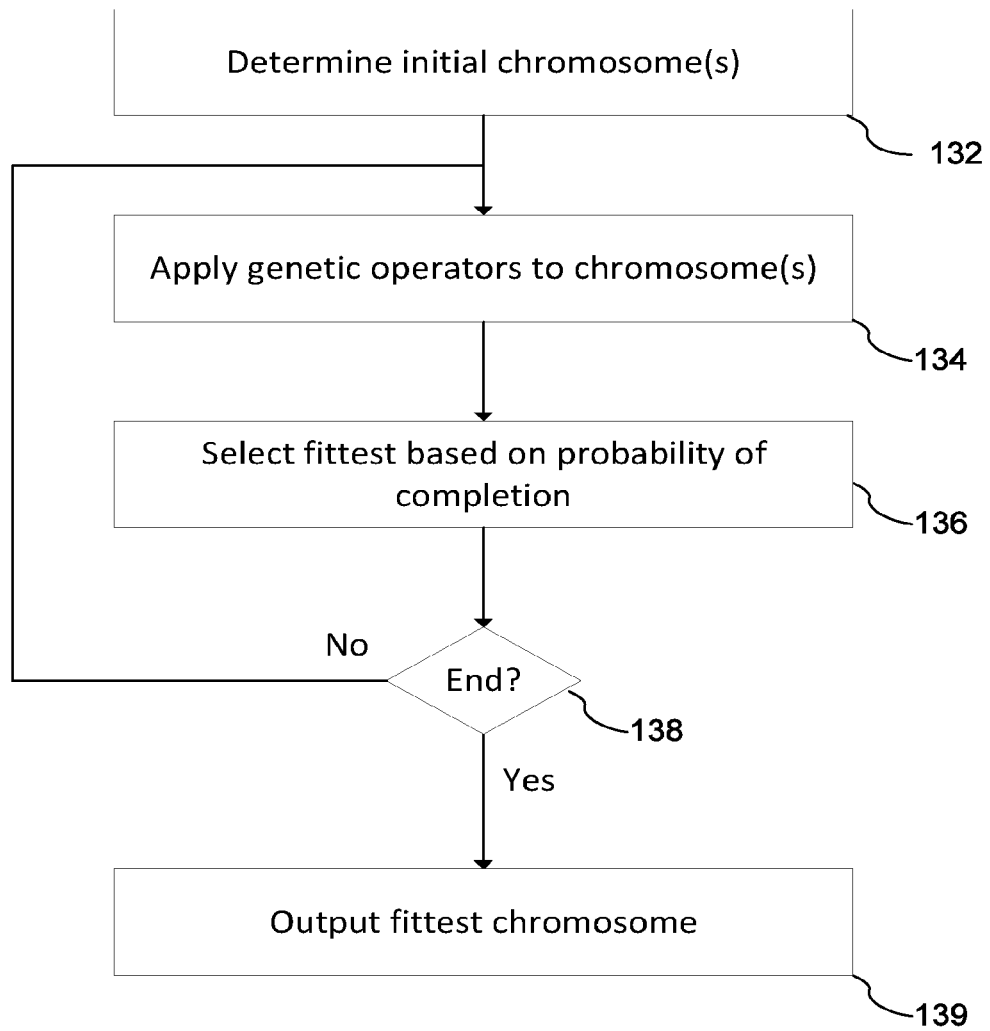
FIG. 4 shows a genetic algorithm approach according to an arrangement.

FIG. 4 shows a genetic algorithm approach according to an arrangement.

The optimization comprises an iterative genetic algorithm. This represents either a strategy or a path for a single agent as a chromosome and applies genetic operators to the chromosomes 132 before selecting the fittest chromosomes based on their probability of completion 134. This is repeated a number of times. Accordingly, after each iteration, it is determined whether the end has been reached 136 (e.g. whether a predetermined number of iterations has been reached or whether a predetermined probability of completion has been obtained). If not, then the method loops back to step 132 to apply the genetic operators to the newly selected set of chromosomes (a next generation). If the end has been reached, then single fittest chromosome (e.g. the determined strategy or determined path) is output 139. The fitness (the probability of completion) for the chromosome may also be output.

As mentioned above, two approaches are proposed herein, a path-based approach and a greedy approach. In the path-based approach, the genetic algorithm is applied simultaneously across all agents to find the reliability-optimal strategy (including paths for all agents). In the greedy approach, the genetic algorithm is applied repeatedly, each time finding an optimal path for a single agent based on the previously found paths, until paths have been allocated for all agents.

Path-Based Genetic Algorithm

In the path-based approach, the genetic algorithm is applied simultaneously across all agents to find the reliability-optimal strategy (including paths for all agents). Each chromosome directly represents a multi-agent path plan or strategy $\psi$, i.e. the set of paths for each agent.

Each agent's path is encoded as its first visit to each task. Accordingly, each individual path does not specifically specify revisits to specific tasks and is not limited by connectivity (i.e. there is no constraint to require subsequent tasks to be connected to each other). Having said this, when a path is implemented, the agent necessarily will need to pass between any intervening tasks when moving between two non-connected tasks. This is taken into account in the optimization by the increased time to reach the next task (due to increased distance travelled) and thereby a decreased probability of completion (and in some cases an increased time to completion).

The population $P:=\{\psi^{(1)}, \ldots, \psi^{(\mu)}\}$ for a population size $\mu$. Note, in this notation, $\psi^{(j)}$ represents the $j^{th}$ chromosome of the population, unrelated to any particular agent. Each chromosome in the population is initialised using a simple partitioning of the environment, each agent being assigned to its own partition. This partitioning may be through clustering (e.g. k-means clustering). In addition, or alternatively, random paths (random ordering of tasks) may be assigned for the initialization of one or more chromosomes. Load balancing may be applied to constrain the clustering to ensure similar sized clusters.

The optimisation goal is to maximise the fitness function. Two chromosome fitness functions are defined:
  (i) Only probability of completion (maximise probability of completion)
  (ii) A weighted sum of probability of completion and the time taken to completion with no failures ('POC+time'). This is in effect a multi-objective optimization. As the method aims to minimize the time, the weighted sum applies a negative coefficient to time to attempt to minimize time to completion whilst maximizing probability of completion. The time for each task is based on the speed of the agents, the distance between tasks (as encoded in the graph) and may also include a time to complete the task (before moving to the next task). In the results presented herein, the time to complete the task is set to zero.

The following operators are implemented for reproduction. The genetic operators applied include mutation operators and crossover operators.

Mutations operate on a single chromosome. The mutation operators include:
  (1) swap-mutation—this randomly swaps consecutive tasks from a random agent.
  (2) add-mutation—this adds a random task to a random agent.
  (3) delete-mutation—this removes a random task from a random agent.
  (4) roll-mutation—this randomly cycles the starting task of a random agent by a random amount in the chromosome.

Crossover operates on a random pairing of chromosomes to output two new chromosomes. The crossover operators include:
  (1) sequence-crossover—this chooses a random agent from each chromosome. A split point on each agent's path is randomly chosen, and the paths are spliced together—the start of one to the end of the other and vice versa.
  (2) path-crossover—this chooses a random agent from each chromosome and swaps their respective paths.

Random selection is used for reproduction. That is, the genetic operators are applied to a random selection of the chromosomes.

Tournament selection is used for constructing the next generation. This chooses k random individuals (chromosomes), where k is the tournament size. Selection occurs over the entire population of chromosomes. This includes both non-reproduced and reproduced chromosomes from the previous generation. From the k randomly selected individuals, a predefined number of the fittest individuals are then selected from this tournament to be passed onto the next generation. A predefined number of tournaments may be implemented. By adjusting the tournament size and the number of tournaments, the amount of variance introduced by the selection can be controlled. For instance, a larger number of smaller tournaments will increase the likelihood of chromosomes with lower fitness being passed on to the next generation.

Greedy-Genetic Algorithm Approach

The core element of this approach is that the genetic algorithm is used to find the reliability-optimal path for a single agent, given a set of previously found paths. This genetic algorithm is then applied iteratively to construct a full path plan agent per agent.

A chromosome (or member) is constructed as a single ordered set of tasks $\psi_i$. The population is $P_i:=\{\psi_i^{(1)}, \ldots, \psi_i^{(\mu)}\}$ for a population size $\mu$. Note, in this notation, $\psi_i^{(j)}$ represents the $j^{th}$ chromosome of the population, used to determine the path for the $i^{th}$ agent. The chromosome fitness is defined to be the probability of completion based on the new path (the chromosome) and the previously determined paths (i.e. $\Psi \cup \{\psi_i\}$ where $\Psi$ are the trajectories found in previous iterations).

The optimisation goal is thus to maximise the fitness function of probability of completion. As the probability of completion metric inherently favours shorter routes (thereby reducing the likelihood of failure), the strategy is constructed by accumulating the minimum time taken for each agent to travel between its tasks via the shortest path with respect to the environment graph. In addition, by applying a soft-constraint on connectivity through more desirable probability of completion values, routes that require backtracking can also be found for environments with no Hamiltonian Cycles.

In training, the method is initialised with a valid tour of the environment. This tour can be a random tour a travelling salesman tour, or any other (potentially random) ordering of tasks. That is, an agent is assigned a set of linked tasks from the environment graph. Each agents' chromosome may be initialised identically.

To determine the chromosome (the path) for the next agent, the following five mutation and crossover operators are then implemented for reproduction:
  (1) swap-mutation—this randomly swaps consecutive tasks.
  (2) add-mutation—this adds a random task.
  (3) delete-mutation—this removes a random task.
  (4) roll-mutation—this randomly cycles the starting task by a random amount in the chromosome.
  (5) sequence-crossover—this takes a random pair of chromosomes and chooses a random split point on each in order to splice the paths together—start of one to the end of the other and vice versa—to output two new ones.

Finally, for selection operators, random selection is used for reproduction, and tournament selection with elitism (top k chromosomes are kept) is used for constructing the next generation (as described with regard to the path based genetic algorithm).

As mentioned, the fitness of each chromosome (each path) is determined based on the probability of completion based on the new chromosome and each previously determined chromosome (path).

As this greedy approach applies only to the selection of a paths for a single agent, it is repeated for each agent until paths for all agents have been determined. This greedy approach is shown in Algorithm 1 and FIG. 5.

| Algorithm 1 Greedy Genetic Solver |
|---|
| Input: number of agents n, environment graph G, agent failure models f |
| Output: Strategy $\Psi$, Probability of Completion PoC$_{best}$ |
| 1:  $\Psi \leftarrow \emptyset$, PoC$_{best}$ = 0.0 |
| 2:  for i = 1 to n do |
| 3:    // Input is the the current set of trajectories, number of agents, environment graph and failure models |
| 4:    PoC$_{new}$, $\psi_i$ = genetic_find_trajectory($\Psi$, i, G, f) |
| 5:    PoC$_{best}$ = PoC$_{new}$ |
| 6:    $\Psi = \Psi \cup \{\psi_i\}$ |
| 7:  end for |
| 8:  return $\Psi$, PoC$_{best}$ |

Figure 5:
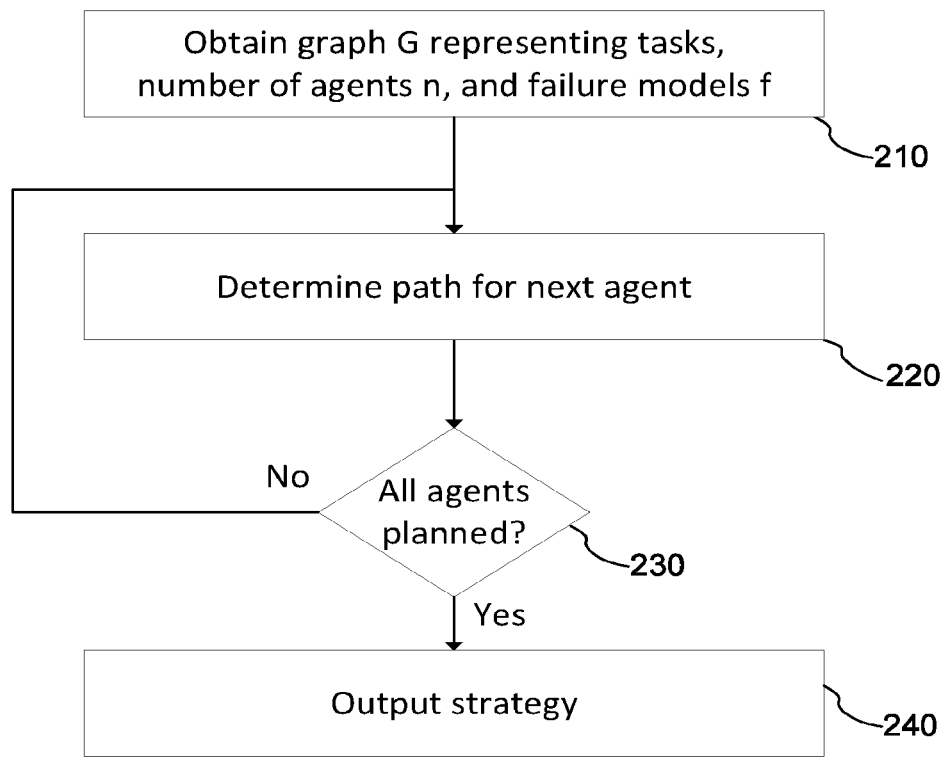
FIG. 5 shows a method for determining a strategy using a greedy genetic algorithm according to an arrangement.

FIG. 5 shows a method for determining a strategy using a greedy genetic algorithm according to an arrangement.

The method starts by obtaining 210 the graph G representing the tasks, the number of agents n and the failure models $f_i(t)$ (for use in determining probability of completion for the $i^{th}$ agent).

The strategy is initialized as empty (no paths allocated) and the current best probability of completion is set to zero.

The first agent is selected for path allocation. The path for this agent is then determined 220 using the greedy genetic algorithm discussed above (see FIG. 4). That is, a number of potential paths (chromosomes) are determined and reproduction and selection are implemented over a number of generations before a final path is selected. This is all based on a fitness objective comprising the probability of completion based on the proposed path (the chromosome) and any previously allocated paths. The probability of completion, as discussed above, is determined based on the failure model for $f_i(t)$ the agent.

Once the path has been determined, it is determined whether all agents have been planned 230 (paths have been allocated for all agents). If not, then the method loops back to step 220 to determine the path for the next agent. If all agents have been allocated, then the final strategy is output 240.

As mentioned previously, the probability of completion for a given strategy is determined based on one or more failure distributions for the agents. This arrangements described herein can use any generic probability distribution to model failure within the reliability calculation. In specific arrangements, a Bathtub failure distribution is used to model the probability of failure for each agent, giving a more realistic failure distribution.

The Bathtub model is a mixture of three failure distributions, representing early death, useful life, and wear out periods respectively. These failure distributions may be Weibull distributions $f_i(t, \alpha, \beta)$ parameterized by $\alpha$ and $\beta$:

$$f_i(t, \alpha, \beta) = \frac{\alpha}{\beta^\alpha} t^{\alpha-1} e^{-(t/\beta)^\alpha}$$

The Bathtub curve used herein is defined by the resultant distribution generated by a weighted sum of the respective failure rates, with a probability density function ($f_b(t)$) and cumulative density function ($F_b(t)$) respectively:

$$f_b(t) = a_1 f_1(t) R_2(t) R_3(t) + a_2 f_2(t) R_3(t) R_3(t) + a_3 f_3 R_1 R_2(t)$$

$$F_b(t) = 1 - R_1(t) R_2(t) R_3(t)$$

where:
 $f_b(t)$ is the probability density function representing the probability of failure for a given agent b at a given time;

$f_1(t)$, $f_2(t)$ and $f_3(t)$ are probability density functions for device failure (e.g. Weibull distributions) representing early death, useful life, and wear out periods respectively;

$\alpha_1$, $\alpha_2$ and $\alpha_3$ are weights;

$F_b(t)$ is the cumulative density function representing the probability of falure of a given agent b up to a given time;

$R_1(t)$, $R_2(t)$ and $R_3(t)$ are reliability functions representing the probability that the agent will survive past a given time according to the respective probability density functions $f_1(t)$, $f_2(t)$ and $f_3(t)$.

Reliability functions $R_i(t)$ and failure functions $f_i(t)$ are related to each other by a corresponding failure rate:

$$\lambda_i = \frac{f_i(\tau)}{R_i(t)}$$

The failure rate (or hazard rate) $\lambda_i$ is a system parameter that can be adapted based on the respective scenario.

Figure 6:
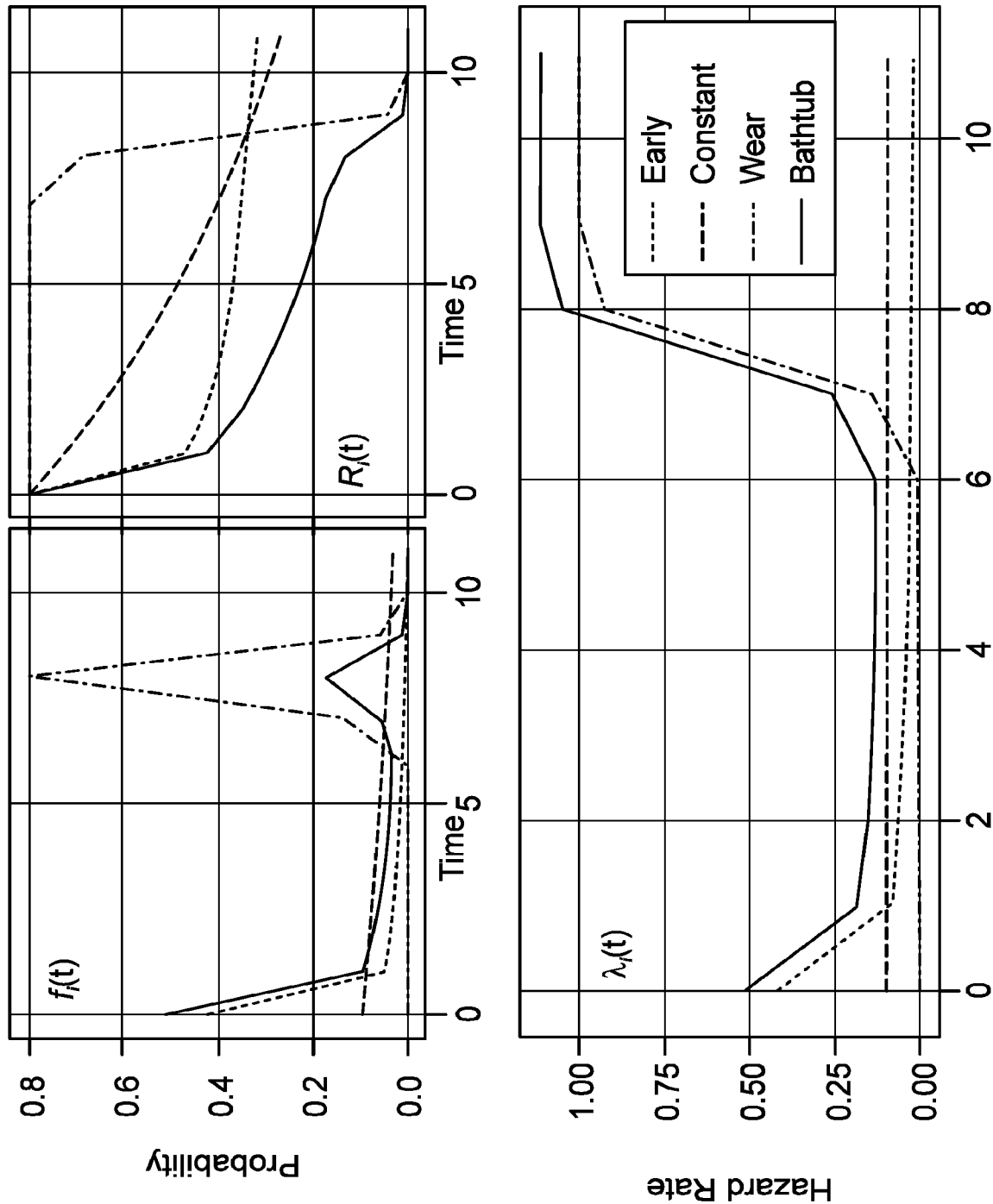
FIG. 6 shows an example of a bathtub failure distribution.

FIG. 6 shows an example of a bathtub failure distribution. This is parameterised for 10% failure at t=1 (i.e.) $\lambda(1)=0.1$ with $\alpha=16.4$ and $\beta=0.22$), a constant random failure rate of 10% (i.e.) $\lambda(t)=0.1$ with $\alpha=10$ and $\beta=1$), and for 80% failure by time t=8 (i.e. $\lambda(8)$ $\alpha=0.8$ with $\alpha=8.63$ and $\beta=24.89$). The parameters for these distributions can either be chosen dependant on the risk level acceptable from the user, or can be fitted from a failure data set collected from observations of the agent's performance of a set of sample tasks.

Figure 7A:
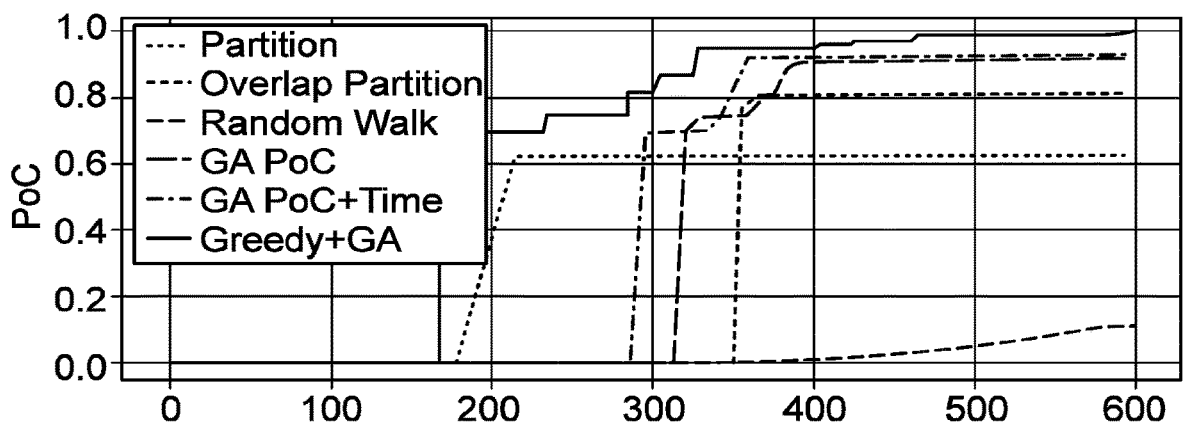
FIGS. 7A-7C show plots of probability of completion over time for three different sets of tasks and for six different methods of determining strategies.
Figure 7B:
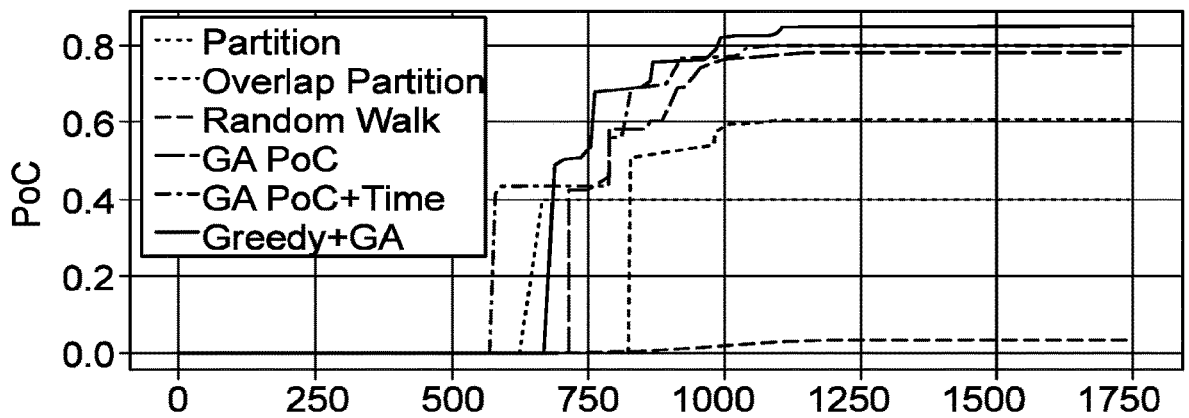
Figure 7C:
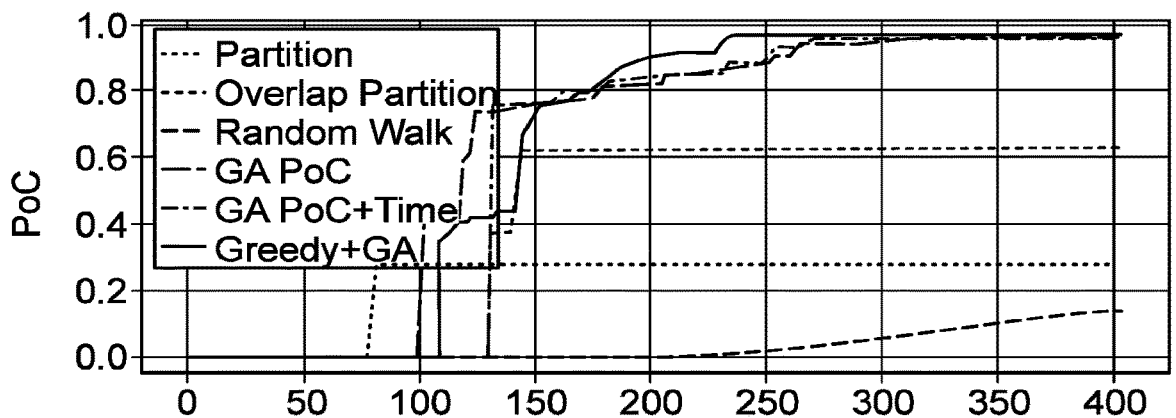

A comparison of results can be seen in FIGS. 7A, 7B and 7C. The environment graphs for these results are shown in FIGS. 8A, 8B and 9

FIGS. 7A-7C show plots of probability of completion over time for three different sets of tasks and for six different methods of determining strategies. The methods include three non-reliability based methods and three reliability based methods. The three reliability methods are as described herein:
 1) a path-based genetic algorithm based on probability of completion (GA PoC);
 2) a path-based genetic algorithm based on probability of completion and earliest completion time (GA PoC+Time); and
 3) a greedy genetic algorithm (Greedy+GA).

The non-reliability based methods include:
 1) a partitioning method representing existing solutions to MCPP (partitioning);
 2) a simple extension to partitioning where the agents' paths overlap with a neighbour (Overlap Partition); and
 3) random walk These methods were evaluated on three sample environments: (i) Aircraft Inspection Scenario 1 shown in FIG. 8A, (ii) Aircraft Inspection Scenario 2 shown in FIG. 8B, and (iii) A Laboratory Tour Scenario shown in FIG. 9 to evaluate the method on a real location. These scenarios are described in more detail below.

Figure 8A:
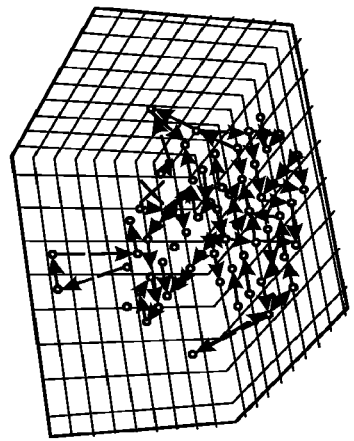
FIGS. 8A and 8B show paths determined by a greedy genetic algorithm method as described herein for two aeroplane inspection environments.
Figure 8A:
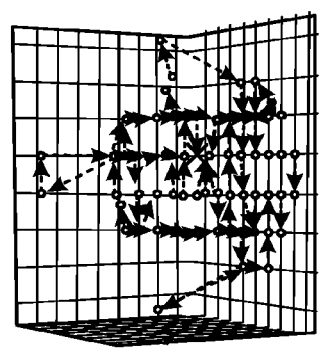
Figure 8A:
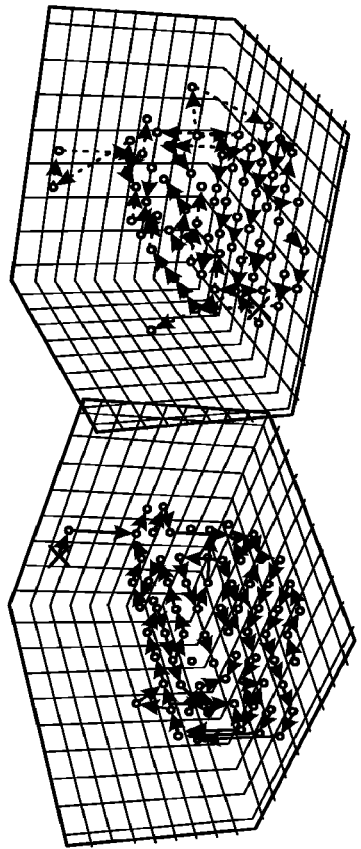
Figure 8B:
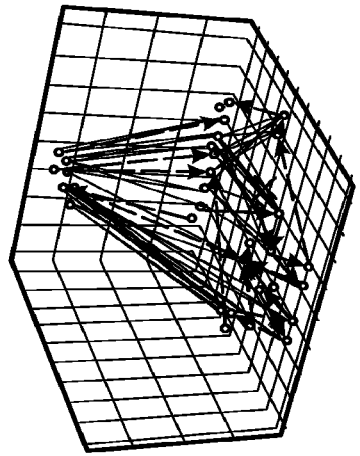
Figure 8B:
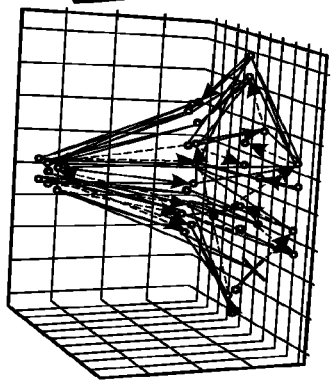
Figure 8B:
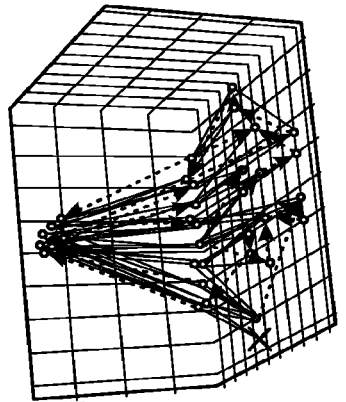
Figure 8B:
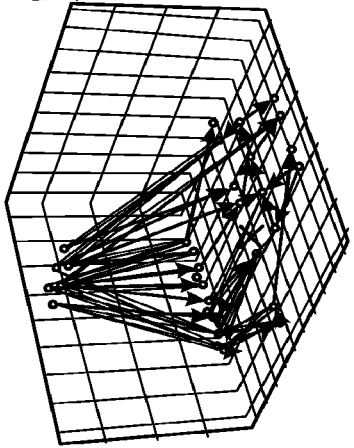
Figure 9:
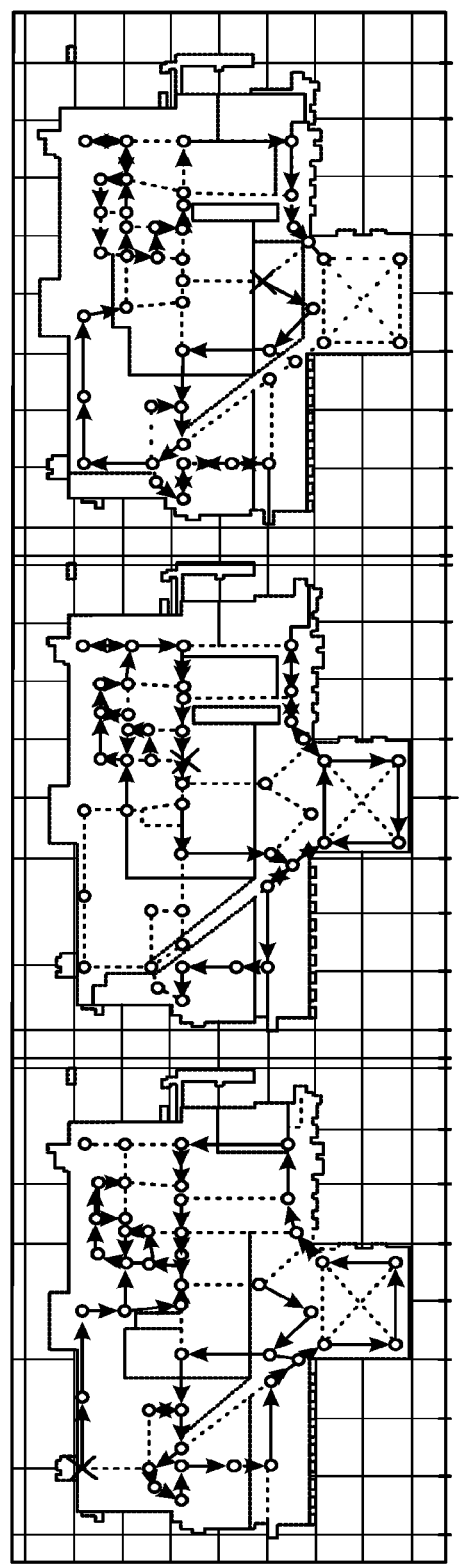
FIG. 9 shows paths determined by a greedy genetic algorithm method as described herein for a laboratory tour scenario.

FIGS. 8A and 8B show paths determined by a greedy genetic algorithm method as described herein for two aeroplane inspection environments. Each of FIGS. 8A and 8B show the paths determined for four drones in the respective aeroplane inspection environment. The crosses indicate the starting location for the drones, traversable edges are shown in grey and paths are marked by arrows.

Both graph-based environments were generated from a 3D aircraft mesh (in this case, of a Boeing 747) by applying Adaptive Viewpoint Sampling at different resolutions and adaptation levels. In the first scenario (FIG. 8A) the edges were generated by connecting the closest nodes together. In the second scenario (FIG. 8B) the edges were generated by connecting all possible nodes and then removing edges which would intersect the aircraft. Accordingly, the first scenario relates to an environment with many tasks but fewer connections whilst the second scenario relates to an environment with an environment with fewer tasks but greater interconnectivity.

For the first scenario, the greedy genetic method achieved a probability of completion of 0.9978 at t=597 s based on a bathtub1500 failure model. For the second scenario, the greedy genetic method achieved a probability of completion of 0.9636 at t=304 s based on a bathtub800 failure model. The parameters for these models are shown below:

| Name | Weibull 1 | | Weibull 2 | | Weibull 3 | |
| --- | --- | --- | --- | --- | --- | --- |
| | $\lambda$ | $\mu$ | $\lambda$ | $\mu$ | $\lambda$ | $\mu$ |
| bathtub800 | 0.39 | 2000 | 1.00 | 1000 | 5.80 | 600 |
| bathtub1500 | 0.76 | 5000 | 1.00 | 5000 | 11.10 | 1100 |

FIG. 9 shows paths determined by a greedy genetic algorithm method as described herein for a laboratory tour scenario. The graph for the laboratory tour (FIG. 9) was generated by hand considering major junctions, doorways and thoroughfares. Three routes are presented, representing three agents. Again, crosses indicate starting locations, lines represent graph edges and arrows represent paths. Interestingly, the 3rd robot overlaps the others, presumably in case of early failure.

As shown in FIGS. 7A-7C, the reliability-based methods (GA PoC, GA PoC+Time and Greedy+GA) all achieve much greater probabilities of completion. The values of interest are the PoCs at the deadline, which is set to the time taken for an agent to traverse a tour of the environment, i.e. the rightmost data points in each graph.

Figure 10:
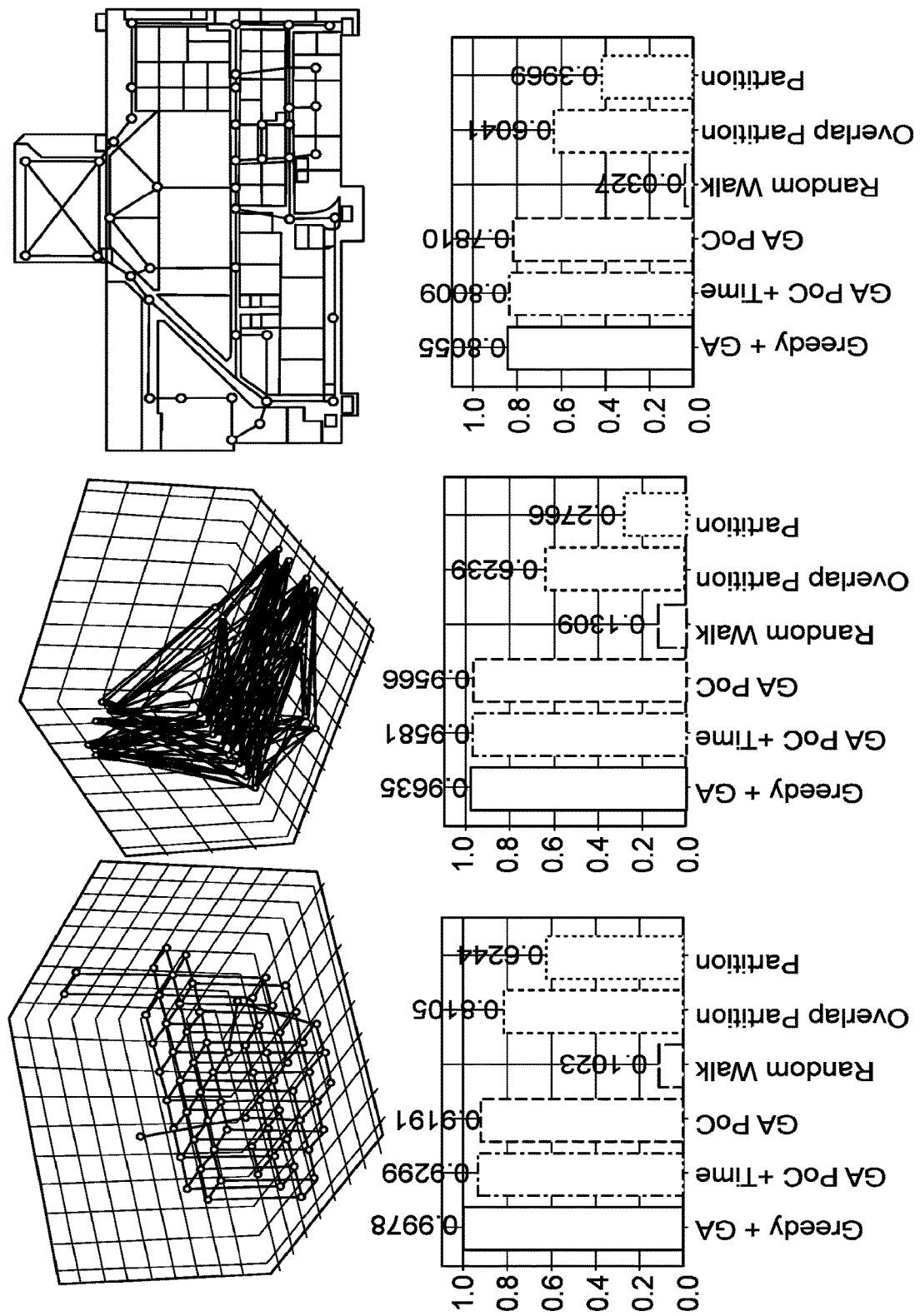
FIG. 10 shows the end probability of completion for the results shown in FIGS. 7A-7C.

FIG. 10 shows the end probability of completion for the results shown in FIGS. 7A-7C. Crucially, all of the figures show the significant difference in reliability between the strategies found by failure-informed methods compared to non-reliability based methods. Both the path-based genetic method and the greedy-genetic method are shown to find better solutions on all scenarios.

In particular, in both the first scenario and the lab tour (FIGS. 8A and 9), the present arrangements find solutions with a visible increase in reliability. In fact, completion is almost guaranteed in the first scenario with the reliability based methods.

Figure 11:
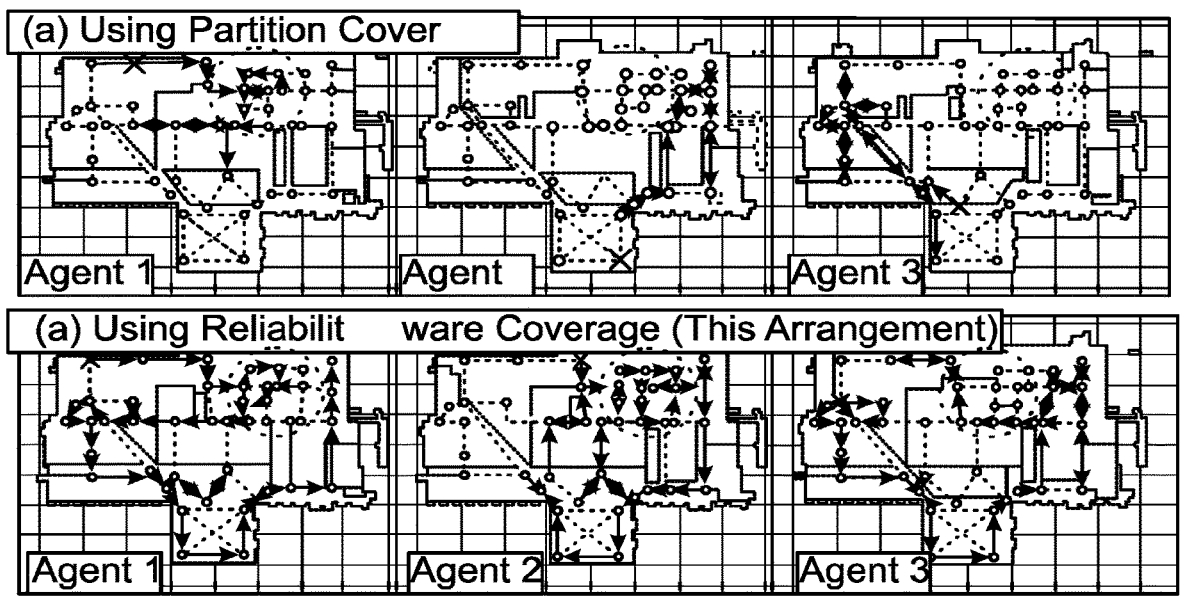
FIG. 11 provides a comparison of the paths generated using partition coverage with the paths generated using reliability aware coverage according to the present arrangements.

FIG. 11 provides a comparison of the paths generated using partition coverage with the paths generated using reliability aware coverage according to the present arrangements. As can be seen, the partition coverage method avoids overlaps, instead allocating separate (non-overlapping) subsets of tasks to the agents. In contrast, the reliability-aware method includes overlaps between agents, where each task is allocated at least two of the three agents. This ensures that there is back-up for the event that one of the agents fails.

The arrangements discussed herein provide reliability-based methods for determining strategies for completing tasks that have a probability of failure. This allows the strategies to be determined based on probability of completion. By taking into account the potential for failure, strategies can be produced with built in redundancy to ensure that, even where one or more agents fail, other agents can compensate for this failure. This increases the likelihood of that the required tasks will be completed. Importantly, accounting for the possibility of agent failure, the strategy can be implemented without any mechanisms for adapting to failure. This ensures that, once the strategy has been distributed to the agents, each agent can act independently based on their respective path (set of tasks) without requiring communication with any central hub or with any other agents.

Figure 12:
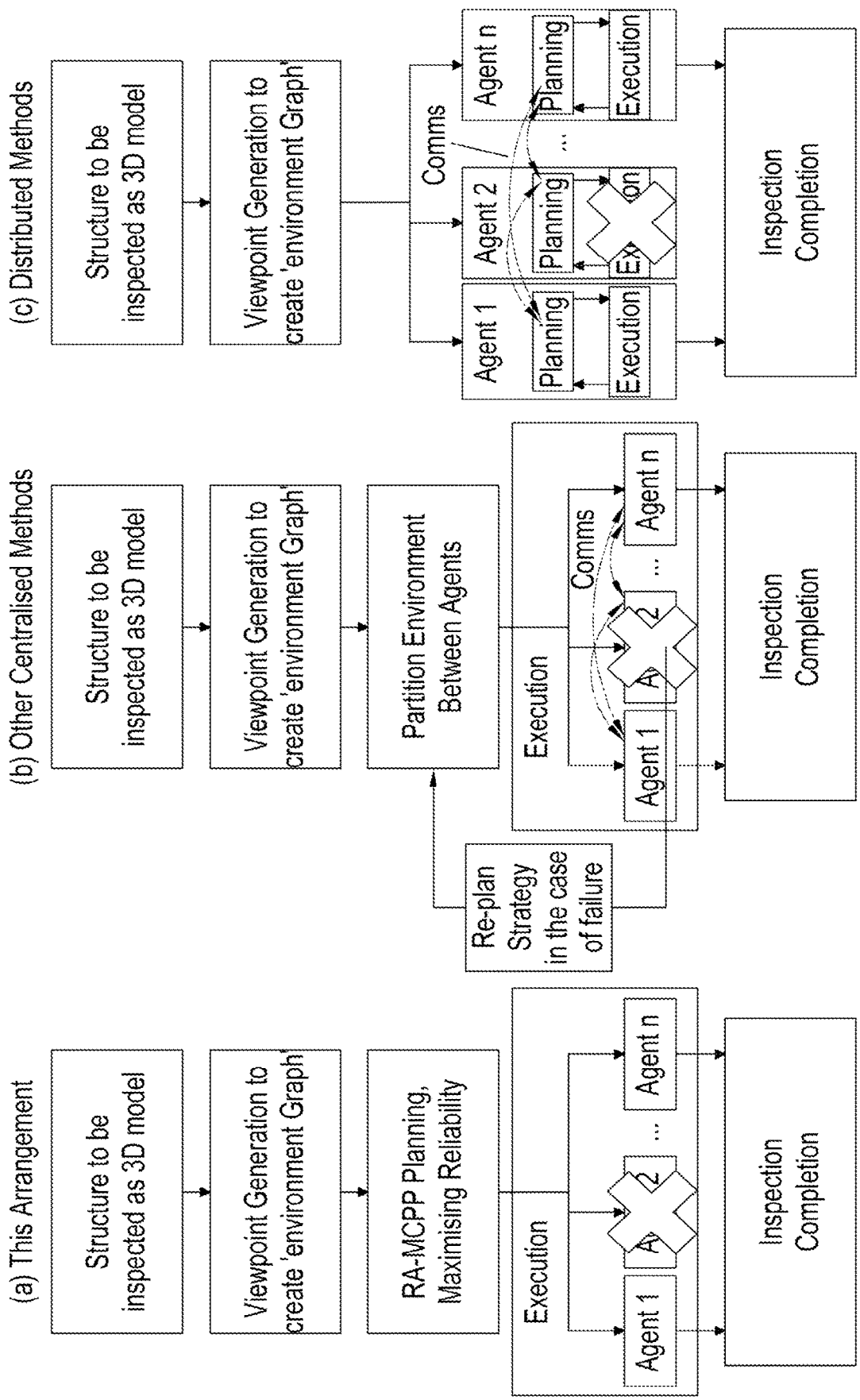
FIG. 12 shows a comparison of the present reliability based arrangements, centralised methods and distributed methods for structure inspection.

FIG. 12 shows a comparison of the present reliability based arrangements, centralised methods and distributed methods for structure inspection. For each case, the methods obtain a 3D model of the structure to be inspected. Based on this structure, an environment graph is produced through viewpoint generation. After this point, the methods diverge.

For the centralised methods, a central scheduling system determines the strategy for the agents. The environment is partitioned between agents to form the strategy, and this strategy is sent to the agents. As the strategy doesn't take into account the probability of failure (e.g. there is no route overlap between agents), a re-planning mechanism is required in the event that an agent fails. The agents communicate with each other to ensure that they are all functioning. In the event that an agent fails, this failure is communicated to the scheduling system which re-plans the strategy to account for the failure. The new strategy is then distributed to the agents which implement this until completion (or until further failure, which results in further re-planning).

For the distributed methods, the agents determine their own paths based on communication between the agents. Each agent plans and executes its own route based on the environment graph and based on information received from the other agents regarding their respective plans. If an agent fails, then the remaining agents can compensate for this due to their distributed scheduling mechanism.

Both of the above methods require additional processing and communications overheads in order to adapt to failure. In the centralised methods, this is in the form of re-planning in the event of failure, and exchange of communications between agents to keep track of their status. In the distributed methods, this is in the form of constant communication between the agents as part of their distributed scheduling. It should also be noted, that as both of these methods require some form of re-planning in reaction to agent failure, there is no guarantee that these methods will be completed by the required deadline, as prior to the point of failure, each agent will be operating as if there would be no failure. After failure, there may not be sufficient time for the agents to complete all of the required tasks.

In contrast to the above, the reliability-aware arrangements described herein result in strategies that can be implemented with a high likelihood of completion from start to finish without requiring re-planning and without requiring communication exchange between the agents. As the schedule inherently accounts for the risk of failure, there is no need for each agent to keep track of the status of other agents. Instead, each agent implements its respective strategy (its route) independently until completion. In addition, as the strategy is optimized based on the probability of completion by a given deadline, and because there is no need to reschedule in the event of failure, these methods greatly increase the likelihood that all required tasks will be completed by the deadline.

Computing Device

Figure 13:
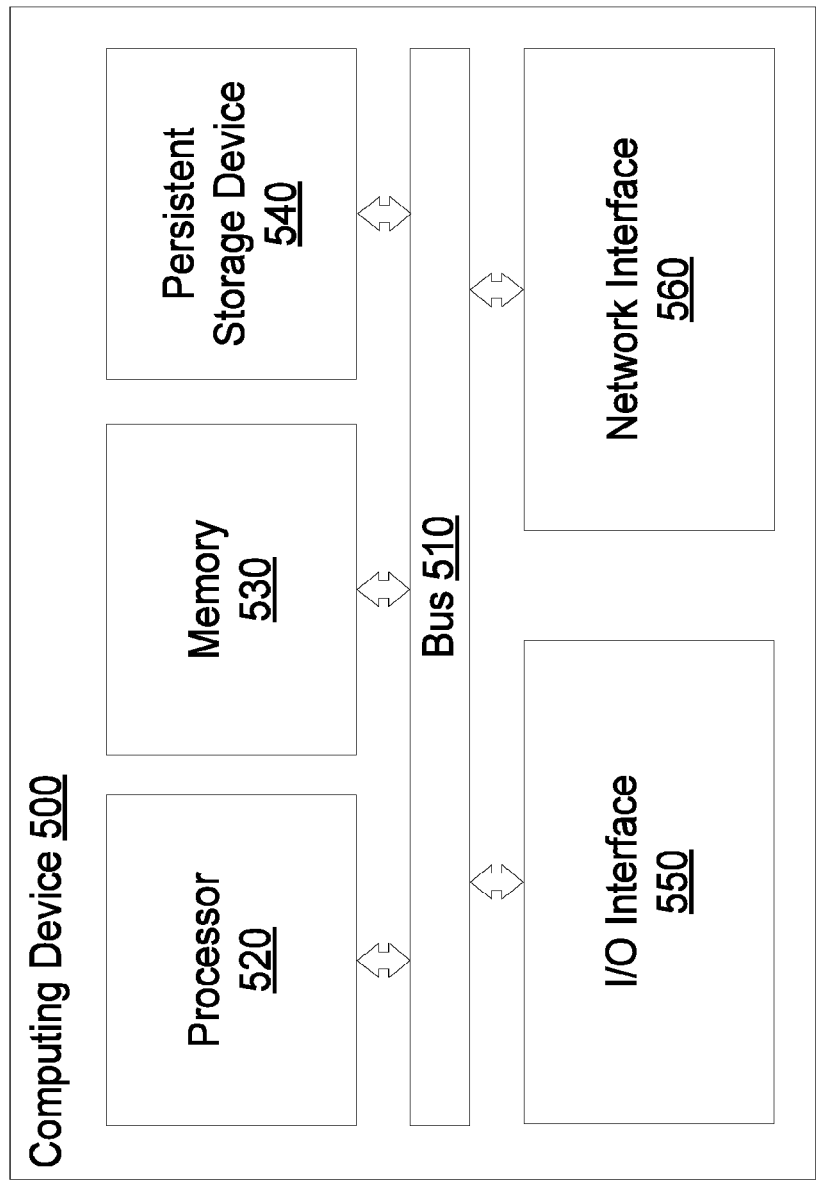
FIG. 13 shows a computing device using which the embodiments described herein may be implemented.

FIG. 13 shows a computing device 500 using which the embodiments described herein may be implemented.

The computing device 500 includes a bus 510, a processor 520, a memory 530, a persistent storage device 540, an Input/Output (I/O) interface 550, and a network interface 560.

The bus 510 interconnects the components of the computing device 500. The bus may be any circuitry suitable for interconnecting the components of the computing device 500. For example, where the computing device 500 is a desktop or laptop computer, the bus 510 may be an internal bus located on a computer motherboard of the computing device. As another example, where the computing device 500 is a smartphone or tablet, the bus 510 may be a global bus of a system on a chip (SoC).

The processor 520 is a processing device configured to perform computer-executable instructions loaded from the memory 530. Prior to and/or during the performance of computer-executable instructions, the processor may load computer-executable instructions over the bus from the memory 530 into one or more caches and/or one or more registers of the processor. The processor 520 may be a central processing unit with a suitable computer architecture, e.g. an x86-64 or ARM architecture. The processor 520 may include or alternatively be specialized hardware adapted for application-specific operations.

The memory 530 is configured to store instructions and data for utilization by the processor 520. The memory 530 may be a non-transitory volatile memory device, such as a random access memory (RAM) device. In response to one or more operations by the processor, instructions and/or data may be loaded into the memory 530 from the persistent storage device 540 over the bus, in preparation for one or more operations by the processor utilising these instructions and/or data.

The persistent storage device 540 is a non-transitory non-volatile storage device, such as a flash memory, a solid state disk (SSD), or a hard disk drive (HDD). A non-volatile storage device maintains data stored on the storage device after power has been lost. The persistent storage device 540 may have a significantly greater access latency and lower bandwidth than the memory 530, e.g. it may take significantly longer to read and write data to/from the persistent storage device 540 than to/from the memory 530. However, the persistent storage 540 may have a significantly greater storage capacity than the memory 530.

The I/O interface 550 facilitates connections between the computing device and external peripherals. The I/O interface 550 may receive signals from a given external peripheral, e.g. a keyboard or mouse, convert them into a format intelligible by the processor 520 and relay them onto the bus for processing by the processor 520. The I/O interface 550 may also receive signals from the processor 520 and/or data from the memory 530, convert them into a format intelligible by a given external peripheral, e.g. a printer or display, and relay them to the given external peripheral.

The network interface 560 facilitates connections between the computing device and one or more other computing devices over a network. For example, the network interface 560 may be an Ethernet network interface, a Wi-Fi network interface, or a cellular network interface.

The processor 520 is configured to implement the methods described herein to determine a schedule for completing a set of tasks. An environment graph representing the tasks may be received either through the I/O interface 550 or the network interface 560. Alternatively, the environment graph may be determined by the processor 520 based on data describing the environment for performing the tasks (e.g. a map of the environment). The determined schedule may be output to the agents either through the I/O interface 550 or through the network interface 560.

Implementations of the subject matter and the operations described in this specification can be realized in digital electronic circuitry, or in computer software, firmware, or hardware, including the structures disclosed in this specification and their structural equivalents, or in combinations of one or more of them. For instance, hardware may include processors, microprocessors, electronic circuitry, electronic components, integrated circuits, etc. Implementations of the subject matter described in this specification can be realized using one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

While certain arrangements have been described, the arrangements have been presented by way of example only, and are not intended to limit the scope of the inventions. Indeed, the novel methods and devices described herein may be embodied in a variety of other forms; furthermore, various omissions, substitutions and changes in the form of the methods and systems described herein may be made.

The invention claimed is:

1. A computer-implemented method comprising:
obtaining a graph representing an environment in which multiple agents are to act, the graph including nodes relating to tasks and edges relating to traversable paths between the tasks, a schedule for the multiple agents being determined to perform a set of the tasks;
determining the schedule for performing the set of the tasks, the schedule including, for each agent, a sub-schedule including tasks to be performed and, for each task to be performed, a corresponding scheduled range of times over which to perform the task;
evaluating, for the schedule, a probability of completion of the schedule, the probability of completion of the schedule being the probability that each task in the set of the tasks will be completed subject to the condition that each agent has a predefined failure rate, wherein evaluating the probability of completion includes:
determining a completion region within state space, wherein the completion region is a range of potential states of the environment that could be achieved by following the schedule such that every task has been visited at least once by any of the agents;
identifying one or more sub-regions within the completion region, each sub-region relating to a given combination of tasks being performed simultaneously by the agents according to the schedule; and determining a total probability mass within the completion region including determining a sum over all sub-regions within the completion region of the probability of completion of each sub-region, wherein the probability of completion of each sub-region is determined by determining an integral of the probability of completion over the sub-region; and determining an updated schedule based on an objective function that aims to provide a greater probability of completion of the schedule; and sending the updated schedule to the agents and controlling at least one autonomous system by implementation of the updated schedule.

2. The method of claim 1 wherein:

each sub-region is bounded for each agent by start and end times for the scheduled range of times for performing a corresponding task for that agent and for that sub-region; and determining the integral of the probability of completion over the sub-region includes:

determining, for each agent, a probability of completion of the sub-region by subtracting a probability of failure by the start time for the sub-region and agent from a probability of failure by the end time for the sub-region and agent; and determining the probability of completion of the sub-region by multiplying together the probabilities of completion for each agent.

3. The method of claim 1 wherein the probability of completion of each sub-region is determined based on a failure model for each agent, wherein the failure model represents a probability of failure for the agent by a given time.

4. The method of claim 1 wherein each edge of the graph has a length that represents a distance of a corresponding traversable path.

5. The method of claim 1 wherein determining the updated schedule includes optimizing the schedule using a genetic algorithm that selects members, each member representing a schedule or a sub-schedule based on their fitness, wherein the fitness is determined based on the probability of completion for the member.

6. The method of claim 5 wherein each member represents a potential schedule and wherein the fitness of a given schedule is determined based on the probability of completion for the given schedule.

7. The method of claim 6 wherein a function of the fitness is one of:

a function that aims to maximise the probability of completion for the given schedule; and a function that aims to maximise the probability of completion for the given schedule whilst minimizing the time to complete the given schedule with no agents failing.

8. The method of claim 6 wherein the genetic algorithm includes implementing one or more genetic operators on a selection of members, the genetic operators including one or more of:

selecting a sub-schedule from a member and swapping a pair of consecutive tasks;

adding a task to a sub-schedule of a member;

removing a task from a sub-schedule of a member;

cycling tasks from a sub-schedule of a member such that the sub-schedule starts at a different task in the sub-schedule;

selecting two sub-schedules from a member and for each, splitting the sub-schedules at a split-point to form start and end portions, and splicing the start portion of each sub-schedule to the end portion of the other sub-schedule; and swapping sub-schedules between two agents for a member.

9. The method of claim 5 wherein:

the genetic algorithm is implemented for each agent to select a sub-schedule for each agent;

each member represents a potential sub-schedule for a given agent; and the fitness of a given sub-schedule is determined based on the probability of completion of a potential schedule including the given sub-schedule and any previously determined sub-schedules.

10. The method of claim 9 wherein the genetic algorithm includes implementing one or more genetic operators on a selection of members, the genetic operators including one or more of:

swapping a pair of consecutive tasks for a member;

adding a task to a member;

removing a task from a member;

cycling tasks from a member such that the sub-schedule for the member starts at a different task in the sub-schedule; and selecting two members and for each, splitting the sub-schedule at a split-point to form start and end portions, and splicing the start portion of each sub-schedule to the end portion of the other sub-schedule.

11. The method of claim 1 wherein determining a completion region within state space includes, for at least one of the agents, applying a binary search to identify the earliest task within the completion region.

12. The method of claim 1 wherein the agents control one or more drones or unmanned vehicles.

13. The method of claim 1 wherein the agents are mechanical agents for interacting with a real-world environment.

14. The method of claim 13 where each agent controls an unmanned vehicle having a camera for inspecting the environment, wherein each task represents a given viewpoint within the environment.

15. A computing system comprising one or more processors configured to:

obtain a graph representing an environment in which multiple agents are to act, the graph including nodes relating to tasks and edges relating to traversable paths between the tasks, a schedule for the multiple agents being determined to perform a set of the tasks;

determine the schedule for performing the set of the tasks, the schedule including, for each agent, a sub-schedule including tasks to be performed and, for each task to be performed, a corresponding scheduled range of times over which to perform the task;

evaluate, for the schedule, a probability of completion of the schedule, the probability of completion of the schedule being the probability that each task in the set of the tasks will be completed subject to the condition that each agent has a predefined failure rate, wherein evaluating the probability of completion includes:

determining a completion region within state space, wherein the completion region is a range of potential states of the environment that could be achieved by following the schedule such that every task has been visited at least once by any of the agents;

identifying one or more sub-regions within the completion region, each sub-region relating to a given combination of tasks being performed simultaneously by the agents according to the schedule; and determining a total probability mass within the completion region including determining a sum over all sub-regions within the completion region of the probability of completion of each sub-region, wherein the probability of completion of each sub-region is determined by determining an integral of the probability of completion over the sub-region; and determining an updated schedule based on an objective function that aims to provide a greater probability of completion of the schedule; and sending the updated schedule to the agents and controlling at least one autonomous system by implementation of the updated schedule.

16. The computing system of claim 15 further comprising mechanical agents configured to implement the updated schedule in a real-world environment.

* * * * *